J. C. SCHOOLEY.
Refrigerator Building.
No. 12,530. Patented March 13, 1855.
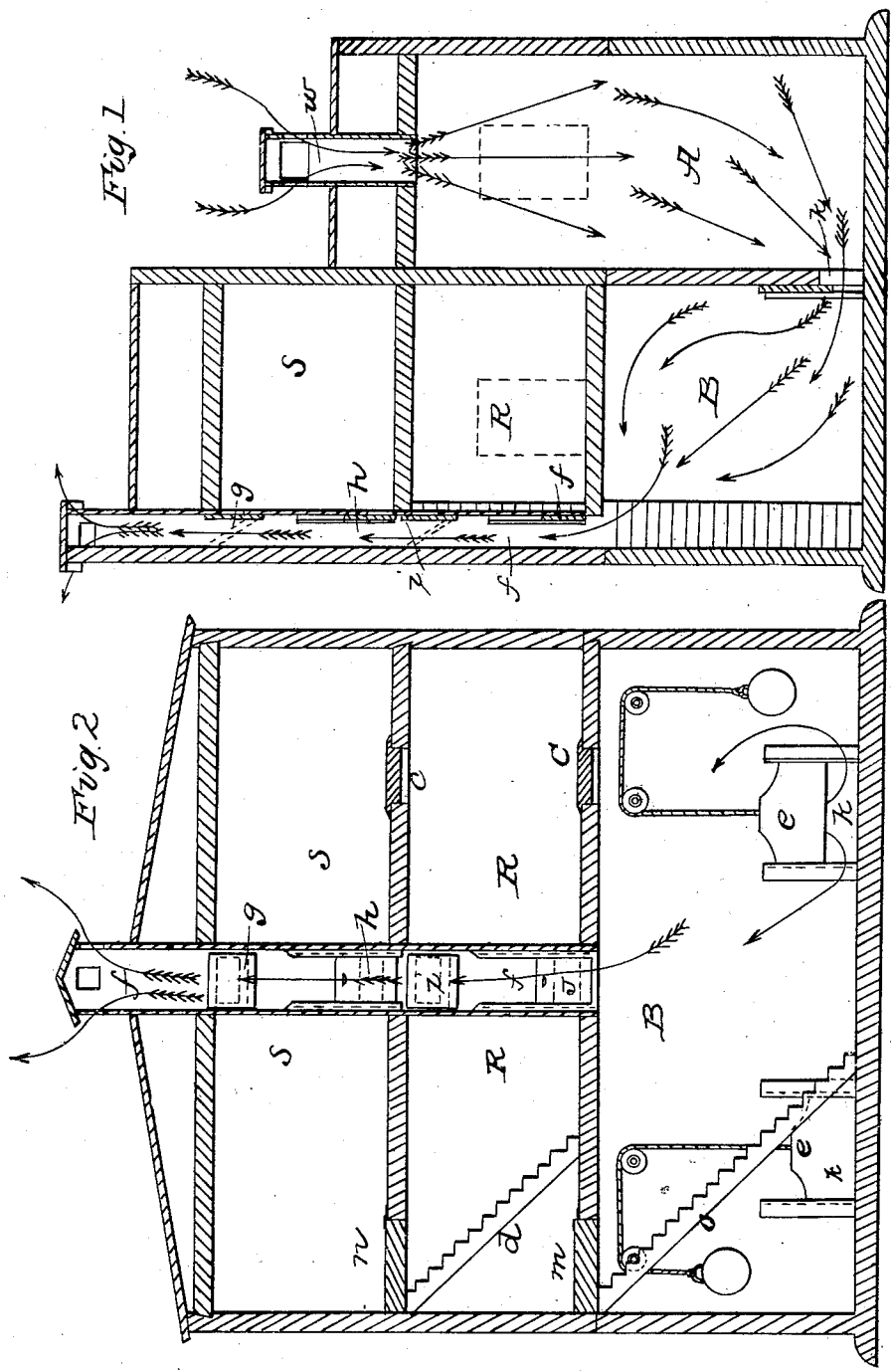

UNITED STATES PATENT OFFICE.

JOHN C. SCHOOLEY, OF CINCINNATI, OHIO.

PROCESS OF CURING MEATS.

Specification of Letters Patent No. 12,530, dated March 13, 1855.

*To all whom it may concern:*

Be it known that I, JOHN C. SCHOOLEY, of the city of Cincinnati, county of Hamilton, and State of Ohio, have invented a new and Improved Method for Curing Meats and Preserving all Kinds of Provisions and Fruits; and I do hereby declare that the following is a full and exact description thereof, reference being had to the accompanying drawing, and to the letters and figures of reference marked thereon, which form part of this specification.

It is a well known fact that in preserving meats from decomposition, from the effects of heat or a high temperature, that ice has been used and applied in a variety of forms, but not sufficiently successful to render any of the methods used of any commercial value, and its application has only served for domestic purposes, when the preservation of provisions were only required for a few days. It has been found in curing meats, in particular, that the atmosphere should be in a certain condition to render it successful. The conditions are, first a certain degree of cold, and secondly a certain state of dryness, and without these conditions, all will prove a failure if attempted. For instance a temperature of forty degrees is sufficiently cold, but dampness even at that degree of cold will make it prove a failure. Why? Because the humid air will not allow the salt to abstract the liquids from the meat, which are the causes of decomposition if allowed to remain with the solid particles when exposed to a warm and moist atmosphere, and in all of the methods invented for curing meats with the use of ice, the presence of too much dampness in the atmosphere has been the only difficulty to contend against.

The nature of my improvement consists in a process for curing meat, fruit and other provisions by means of circulating currents of air artificially dried by ice or its equivalent, through the room wherein the curing takes place, for freeing the apartment of any warm or moist air (caused by the necessary introduction of meats before they are deprived of their animal heat, and the necessary illuminating agents to enable the workmen to operate) and maintaining an uniform temperature from freezing point up to any desired point sufficiently cold to answer all practical purposes in effecting the curing of meats and other provisions so as they will keep when exposed to ordinary summer weather.

My improvement is particularly applicable in the construction of pork houses for the purpose of curing meats in the summer season, and at such times when the weather is not sufficiently cold to cure in the ordinary way.

To enable others skilled in the art, to make and use my improvement, I will proceed to describe its construction and operation, by referring to the accompanying drawings and the letters of reference marked thereon forming part of this specification.

Figure 1, represents a transverse sectional elevation of the curing apartment in connection with the ice cellar, showing the air passages from the surface of the ice into the curing apertment, and ventilating flue furnished with valves for retaining or permitting the air to escape, as may be required. Fig. 2, represents a longitudinal sectional elevation through the pork house, showing the sliding doorways that permit the air to come from the ice, and mode of working the same.

The structure in the present drawing represents a pork house, furnished with an ice cellar by its side, and the house is furnished with a cellar, B, in which the meats or other provisions may be cured or packed, and which is made about sixteen feet deep, more or less, as the demand may require. The ice cellar, A, is of a corresponding depth. The two cellars are connected together by openings K K furnished with sliding doors *e*, *e*, which can be closed and opened at pleasure, they being counterbalanced with weights, as represented in Fig. 2. The ice in the cellar is filled up some four or six feet above the surface of the ground, and at all times is kept above the openings, K, K, in the partition wall, so that the warm atmosphere will not find its way into the curing cellar, B, and thereby at all times secure a cold current of air from the surface of the ice into the curing room or cellar, B, by having the air to pass down through the ice, and become cold, and then pass into the curing cellar, B. The above is the method I employ of obtaining the proper degree of cold, but I do not confine myself to the particular mechanical structure, as specified or represented in the accompanying drawings. The curing room may be as it were, perfectly enveloped in an ice house; with openings to admit the cold current of air from the surface of ice, and hatchways to let in provisions, and an opening for the ventilating flue, all of which I consider equivalent to the plan represented in the drawing.

It is well known that the atmosphere at ordinary temperatures contains much moisture; that when it comes in contact with colder surfaces, that moisture is deposited in the form of dew or rain. Hence in all of the contrivances to effect a curing, or preservation of meats during the summer months by all the plans now in use, are objectionable. To get rid of the moisture, the air in my plan, is passed over the surface of ice, depositing its moisture, then entering the packing room, B, sufficiently cold and dry, but as before stated, in consequence of an introduction of warm meats the air again becomes partially moist and warmer. I then conduct this air off through the ventilating flue $f$, which is provided with valves, either to retain it or allow it to escape out at the roof of the building, or into either of the rooms R and S above the cellar B. When it is desired to free the cellar B of this moist and warm air, all of the valves $g$, $h$, $i$ and J are closed in the side of the ventilating flue as represented in Fig. 1, which permits the air to escape as indicated by the darts marked through the ventilating flue; and out at its top, and when the air which raises from the cellar B is wanted in the rooms R and S above it, all the valves are opened, which causes the air to pass through each room to escape through the top of the ventilator.

$o$, and $d$, represent steps for descending into the curing room, and ascending to the upper story.

$m$, and $n$, are doorways at the top of the steps, and made to fit tight in order to retain and exclude the air as may be required.

$c$, $c$, represent hatchways through the two floors, for the purpose of elevating and lowering provisions.

$w$, is an opening in the roof over the ice-cellar to admit the atmosphere as the spears indicate, which passes down over the surface of the ice, and thereby made cold, depositing its moisture on the cold surface of ice, then passing out at the openings, K, K, into the curing room B, and then thoroughly filling and circulating through all parts of the room, and as it becomes moistened and warmed it passes out of the apartment through the ventilator $f$, $f$, as represented by the darts marked therein to denote the course of the air.

Having thus fully described the nature of my invention what I claim therein as new and desire to secure by Letters Patent is—

The process of curing meat and preserving fruit and provisions by means of circulating currents of air, artificially dried by ice or its equivalent, through the room wherein the curing takes place, substantially as and for the purposes set forth.

JOHN C. SCHOOLEY.

Witnesses:
L. W. SMITH,
MARTIN BENSON.